(12) United States Patent
Jam

(10) Patent No.: US 6,727,829 B2
(45) Date of Patent: Apr. 27, 2004

(54) KEYBOARD WITH INTEGRATED POINTER CONTROL FUNCTION

(75) Inventor: Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 09/860,525

(22) Filed: May 21, 2001

(65) Prior Publication Data

US 2002/0171564 A1 Nov. 21, 2002

(51) Int. Cl.[7] .................... H03K 17/94; H03M 11/00
(52) U.S. Cl. .................. 341/20; 345/163; 345/168; 345/157; 345/159; 341/26; 341/22
(58) Field of Search .................. 341/20, 22, 23, 341/26; 345/163, 168, 159, 157

(56) References Cited

U.S. PATENT DOCUMENTS

| | | | | |
|---|---|---|---|---|
| 3,932,838 A | * | 1/1976 | Sitter ............................ 714/813 |
| 3,932,866 A | * | 1/1976 | Sasaki ........................... 341/24 |
| 5,141,343 A | * | 8/1992 | Roylance et al. ............. 400/472 |
| 5,220,521 A | * | 6/1993 | Kikinis ........................ 708/138 |
| 5,278,557 A | * | 1/1994 | Stokes et al. ................. 341/34 |
| 5,459,461 A | * | 10/1995 | Crowley et al. ............. 341/22 |
| 6,052,071 A | * | 4/2000 | Crowley et al. ............. 341/22 |
| 6,100,875 A | * | 8/2000 | Goodman et al. .......... 345/163 |
| 6,469,694 B1 | * | 10/2002 | Mikan ........................ 345/168 |

* cited by examiner

*Primary Examiner*—Albert K. Wong

(57) ABSTRACT

A dual-function keyboard with two operational modes, a typing mode and a pointing mode. In the typing mode, each visible key functions as in a standard keyboard. In the pointing mode, all the keys function as pointer controllers. The keyboard also employs a novel "one-hot-encoding" circuitry that simplifies the wiring while allowing digital detection of any number of keys that are simultaneously depressed. The keyboard may be made of flexible materials and may be rolled-up or folded for easy transportation.

15 Claims, 7 Drawing Sheets

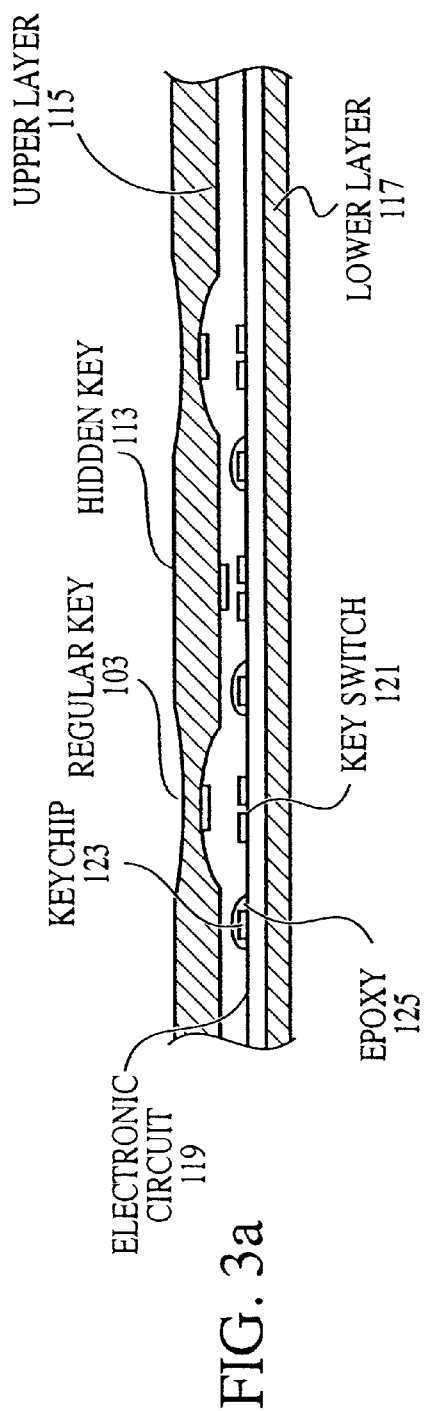
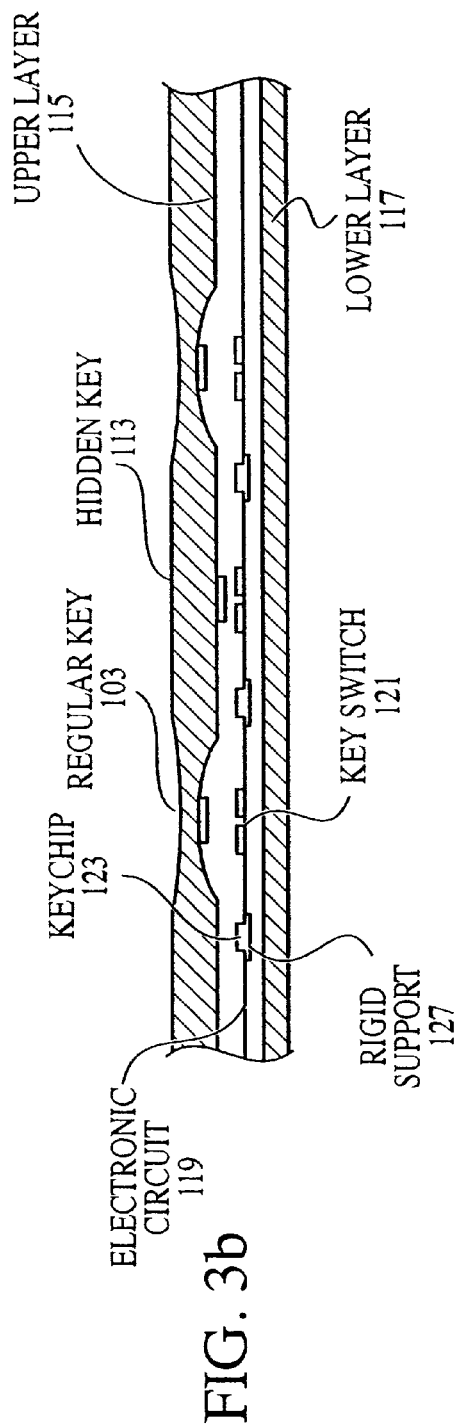
FIG. 3a
FIG. 3b

KEYBOARD WITH INTEGRATED POINTER CONTROL FUNCTION

BACKGROUND OF THE INVENTION

1. Field of the Invention

This invention relates to keyboards having both data entry and pointer control functions.

2. Description of Related Art

Keyboards with Pointer Function

Use of a conventional keyboard and a discrete computer mouse in order to enter typing and pointing information, respectively, into a computer require physical disruption that may significantly reduce a user's productivity. For example, typing on a keyboard and pointing with a mouse require the user to frequently move the user's hands back and forth between the keyboard and the mouse. Moreover, a conventional computer mouse is an external device that requires an additional flat surface to operate.

To reduce hand movement and minimize space requirement, a number of data input devices with combined keyboard/pointer function have been designed and implemented. These designs typically have a pointing device, such as a trackball, a touchpad, or a track point, mounted on a keyboard and are commonly used in lap-top computers. All these devices require complicated hardware and software designs that result in increased cost and reduced reliability.

There are a number of other designs that integrate the pointer function into one or more pre-assigned keys on the keyboard.

U.S. Pat. No. 5,278,557, which is herein incorporated by reference, discloses a keyboard design in which the keyboard contains a cursor movement control key. The cursor movement control key is force-sensitive and can be used in a manner similar to a joystick.

U.S. Pat. No. 6,052,071, which is herein incorporated by reference, discloses a keyboard with keys for moving a cursor wherein the cursor movement is controlled by pressing a plurality of keys in a skewed or sideways manner. This operation, however, is difficult to perform when more than one of the plurality of depressable keys need to be pressed simultaneously in a common skewed direction (col. 3, lines 40–41). Furthermore, when two or more keys are moved sideways to move a pointer on the screen, user's hand position is awkward for most basic upward/downward movements.

U.S. Pat. No. 6,100,875, which is herein incorporated by reference, discloses yet another keyboard pointing device in which the direction of the pointer movement is controlled by designated "mouse keys" in a manner similar to the cursor keys on a standard keyboard, and the speed of the pointer movement is controlled by intervals between keystrokes. However, since each direction of the pointer movement is controlled by a designated "mouse key", it is difficult to move the pointer to the desired direction without actually looking at the keyboard to identify the "mouse key" that controls the movement to that direction.

Flexible Keyboard

The miniaturization of the keyboard has been another focus in the research and development of data input devices, especially in the case of portable electronic devices such as lap-top computers. Although individual keys used in a standard keyboard can be reduced in size, such size reduction often creates user difficulties in comfort and efficiency in operation. Therefore, instead of reducing the size of the individual keys, a lap-top keyboard usually has fewer keys than a standard keyboard and certain keys are rearranged from their normal position to satisfy the sizing constraint. Such modifications can result in excessive motion and typing errors and can sacrifice available options associated with the missing conventional keys.

An alternative to the hard-to-use miniature keyboard is a full size keyboard that can be carried around with a lap-top computer. A number of flexible or foldable keyboards are designed for this purpose.

U.S. Pat. No. 5,141,343, which is herein incorporated by reference, discloses a keyboard that can be compacted, protracted and adjusted to vary its size and the spacing between the keys thereof.

U.S. Pat. No. 5,220,521, which is herein incorporated by reference, discloses a keyboard that is molded from a flexible material and can be rolled into a cylinder for transport and storage.

U.S. Pat. No. 5,459,461, which is herein incorporated by reference, discloses an inflatable keyboard that can be distorted from its functional shape to permit storage in a small compartment. This feature is also integrated into U.S. Pat. No. 6,052,071 to disclose an inflatable keyboard with keys for moving cursor.

Keyboard Circuitry

Conventional keyboard circuit designs utilize a column-row matrix of conductors and key controlled switches, each adapted to feed into the computer a signal representing a particular number or character, or to deliver a predetermined command for commencing a desired operation. When a key is pressed, the corresponding switch provides continuity between the column and row conductors associated therewith. In operation, enabling signals from the data processing system may be sequentially coupled to each column (or row) conductor for scanning the keyboard for depressed keys. A depressed key is sensed when the enabling signal from the depressed key's column (or row) conductor is present on the depressed key's row (or column) conductor. To distinguish between a real signal and an aberrant current fluctuation, the scan is repeated hundreds of times each second. Only signals detected for two or more scans are acted upon by the processor. Specific controlling circuits, such as those disclosed in the U.S. Pat. Nos. 3,932,838 and 3,932,866, which are herein incorporated by reference, were also designed to prevent development of fallacious signals by bouncing or chattering of the keyboard switch contacts.

Standard 104-key keyboards normally use 8 bit microcontrollers and two 8 bit ports as the column driver and one 8 bit port as the row sense input to form a 13×8 matrix. Depending on the wiring layout, the keyboard may also use two 8 bit ports as the column driver and two 8 bit ports as the row sense input, and form a more symmetric 11×10 matrix. If more keys are required in an application, a larger matrix will be needed. The complexity of the scanning circuit IC and wiring will increase accordingly which, in turn, will raise the cost of manufacture of the keyboard.

SUMMARY OF THE INVENTION

The present invention comprises a dual-function keyboard with two modes of operation, a typing mode and a pointing mode. The mode of operation is preferably controlled by a mode switch on the keyboard.

An embodiment of the dual-function keyboard comprises a surface layer including a plurality of keys, and an electronic circuit under the surface layer having a plurality of key sensors and a keyboard controller. The layout of the keys on the dual-function keyboard preferably is in a standard keyboard format. The key sensors generate sensor signals when the keys are contacted. The keyboard controller scans the key sensors, detects sensor signals, and generates scan codes representing numbers or characters, a pre-determined command for commencing a desired operation, or a pointer movement. In the typing mode, the keys function similarly to standard keyboard keys. In the pointing mode, the keys serve as pointer controllers. Additional "hidden keys" and corresponding key sensors may be added to the dual function keyboard in spaces between the visible keys to improve the direction and speed control of the pointer movement.

In a preferred embodiment, each key sensor may comprise a key switch that detects a depressed key, and a keychip that generates the sensor signal sent to the keyboard controller. This one-chip-per-key design converts one centralized large keyboard controller into a plurality of distributed mini-controllers (the keychips and the keyboard controller). One advantage of the one-chip-per-key design is that it reduces the mechanical rigidity of the circuit. Furthermore, by using a "one-hot-encoding" circuit design, increasing the number of keys and key sensors (e.g., adding hidden keys) does not affect the design of the keyboard controller, in contrast to a matrix circuit wherein the number of pins for the keyboard scanning circuit IC necessarily increases as the number of keys increases. By maintaining the size of the keychips and the keyboard controller, the one-chip-per-key design allows more flexibility in terms of adding hidden keys to increase the resolution of pointer movements.

In addition, the one-hot-encoding circuit design requires a simple circuit that minimizes the number of wires that are routed on the dual-function keyboard, therefore reducing the cost of the wiring. Likewise, the one-hot-encoding circuit design allows digital detection of any number of keys that are simultaneously depressed.

In another preferred embodiment, the dual-function keyboard is made of flexible material and may be rolled up or folded for transport or storage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3a and FIG. 3b are cross-sectional views of a dual-function keyboard showing the different mountings of a keychip.

DETAILED DESCRIPTION OF THE PREFERRED EMBODIMENTS

Figure 1:
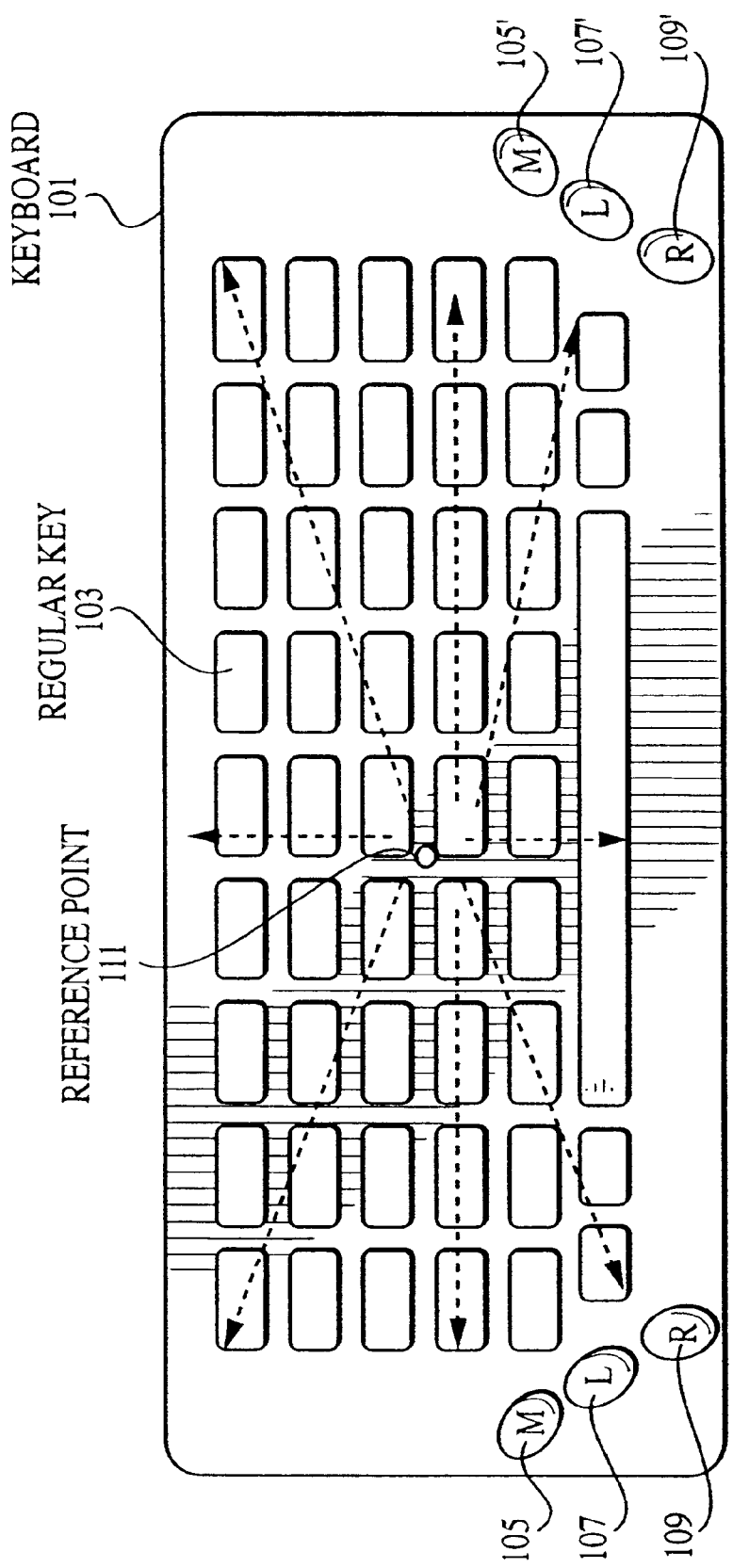
FIG. 1 is a plan view of a dual-function keyboard.

FIG. 1 offers a top view of a dual-function keyboard 101. The dual-function keyboard 101 preferably comprises a plurality of visible keys 103, two buttons marked "M" 105 and 105', two buttons marked "L" 107 and 107', two buttons marked "R" 109 and 109', and a reference point 111 for a pointer control function. The reference point 111 may or may not be marked on the dual-function keyboard 101. The layout of the visible keys 103 may be in a standard keyboard format or in any other format. Buttons 105, 107, and 109 are preferably located at the lower left corner of the dual-function keyboard 101 for right-handed people, while buttons 105', 107', and 109' are preferably located at the lower right corner of the dual-function keyboard 101 for left-handed people. The dual-function keyboard 101 may be designed with only one set of the buttons marked M, L and R (e.g. only buttons 105, 107, and 109). The M buttons 105 and 105' are mode switches that switch the function of the dual-function keyboard 101 from standard keyboard operation (e.g., alphanumeric entry) to pointer control. When neither M button 105 nor 105' is pressed, the dual-function keyboard 101 functions as a standard keyboard (typing mode). When the M button 105 or 105' is pressed, the visible keys 103 function as pointer movement controllers (pointing mode).

In the pointing mode, the position of each depressed visible key 103 relative to the reference point 111, which is arbitrarily assumed to be in the center of the dual-function keyboard, indicates the direction and speed in which the user intends to move the pointer from the pointer's current position. The further the depressed key is from reference point 103, the faster the pointer is moved in the direction from the reference point 111 to the center of the depressed visible key 103. The user can easily navigate the pointer by simultaneously pressing the M button 105 with a finger of the left hand and gliding a finger of the right hand over the dual-function keyboard (or vice versa using the M button 105'). The L buttons 107 and 107' function as a standard "left" mouse buttons, while the R buttons 109 and 109' function as a standard mouse "Right" buttons.

In a preferred embodiment, the dual-function keyboard 101 has a flexible structure. In this embodiment, the visible keys 103 are preferably slightly dimpled into the surface so that gliding a finger is a smoother operation. The number of visible keys 103 in a standard keyboard format (approximately 104 keys) provides sufficient resolution for speed and direction control of a pointer.

Figure 2:
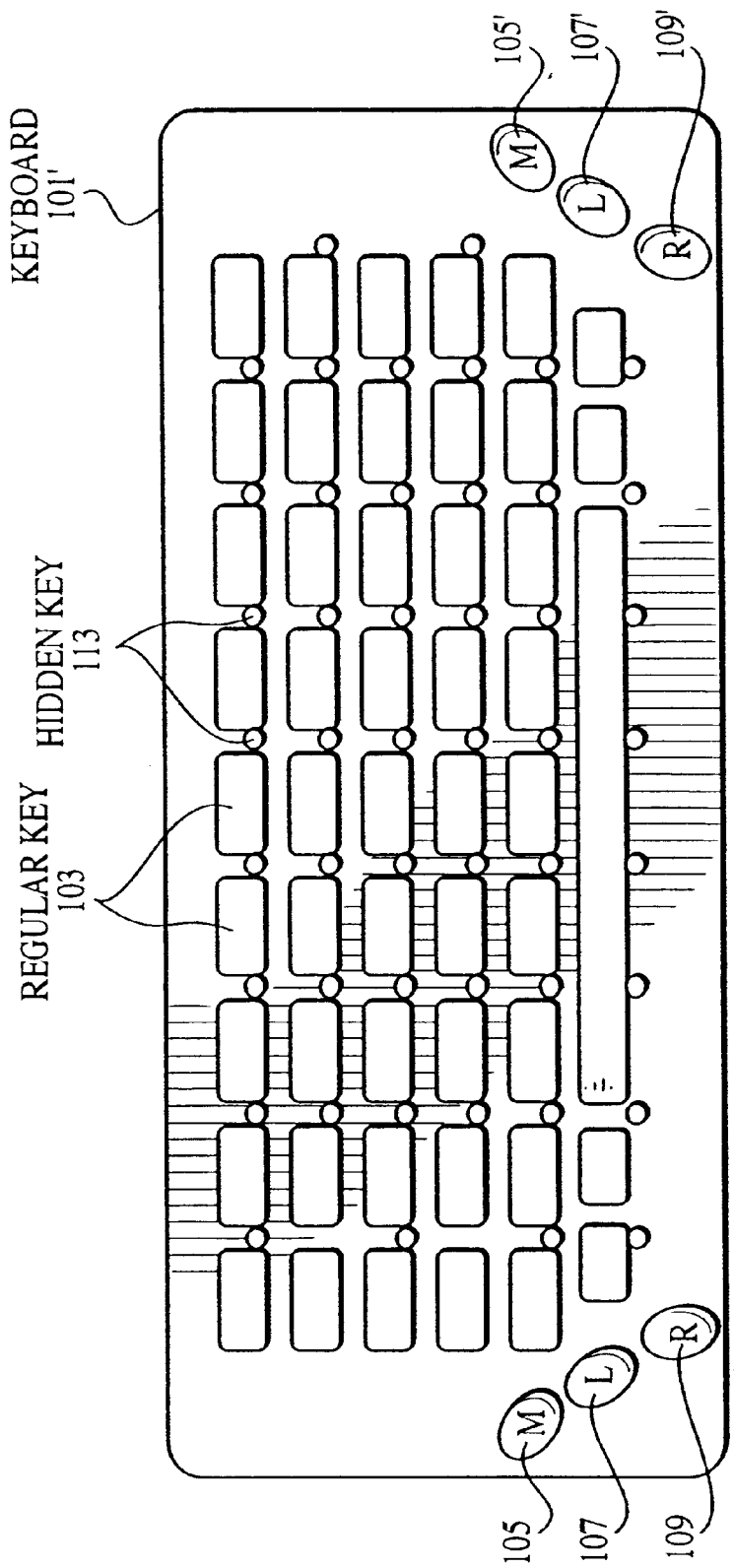
FIG. 2 is a plan view of a dual-function keyboard with hidden keys to improve resolution of the pointer movement.

In another preferred embodiment, the speed and direction resolution can be further improved by incorporating hidden keys 113 between the visible keys 103 in a dual-function keyboard 101'. FIG. 2 shows hidden keys 113 indicated by small circles between the visible keys 103. With the hidden keys 113, it is likely that more than one key may be depressed simultaneously (e.g., a hidden key 113 and a visible key 103). In this embodiment, the simultaneously depressed keys can be averaged to further increase effective direction and speed resolution. The hidden keys 113, however, are preferably functional only in the pointing mode. The number of hidden keys 113 that can be added to a dual-functional keyboard 101 is limited only by the size and cost of the key sensors, and the overall size of the dual-function keyboard 101'. In a preferred embodiment, the number of hidden keys 113 is in a range of 50–400.

FIG. 3a shows a cross-section of the dual-function keyboard 101. The cross-section shows that the keyboard 101 preferably also comprises an upper layer 115, a bottom layer 117, and an electronic circuit 119. The visible keys 103 may be constructed with any known technique such as capacitive, inductive, or contact type switches. This embodiment shows a standard contact type key. The top of each visible key 103 is recessed down slightly (dimpled) to assist gliding of a finger on the top surface. The dimpling also enables the user to feel by touch for the position of each key 103. Preferably, between the upper layer 115 and the bottom layer 117 is the electronic circuit 119. Both layers 115 and 117, and the electronic circuit 119 may be made of flexible materials.

Each visible key 103 preferably has a key switch 121 and its own keychip 123. The keychip 123 is small (e.g., 1 mm×1 mm) and may be a flip-chip directly bonded to the surface of the electronic circuit 119. A small drop of epoxy or other adhesive 125 on top of the keychip 123 as shown in FIG. 3a, or a small rigid support 127 glued to the electronic circuit 119 by adhesive as shown in FIG. 3b, preferably provides rigidity to support the keychip 123. Each hidden key 113 preferably has the same structure as the visible key 103, except that the top of the hidden key 113 is not marked, contoured or otherwise noticeable. Since the keychips 123 are very small, the dual-function keyboard 101 is largely flexible with a small area of rigidity at each keychip 123 location.

The keyboard controller chip (not shown in FIG. 3a and FIG. 3b) preferably is about the same size as the keychips 123. Therefore, the design shown in FIG. 3a and FIG. 3b distributes the rigid key and pointer scanning circuitry in many small spots rather than in one centralized large area. This distribution increases the flexibility of the dual-functional keyboard 101. Furthermore, as explained below, the electronic circuit 119 preferably uses only 3 signal wires (5 wires including power wire and ground wire) in one circuit layer to further increase the flexibility of the circuit.

Figure 4:
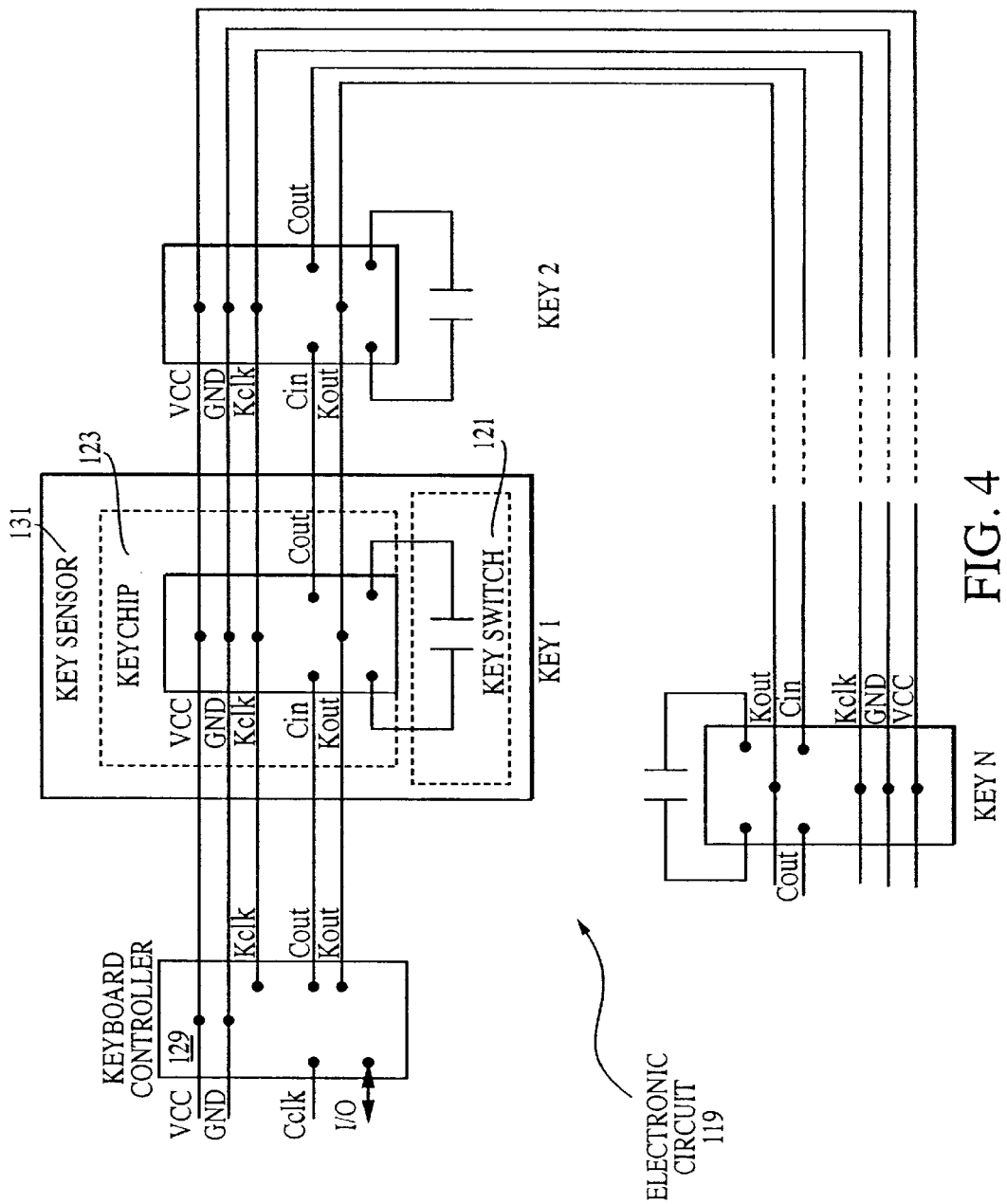
FIG. 4 is a diagram of a keyboard circuit.

To accommodate a large number of keys and recognize simultaneous multiple key entries, a unique "one-hot-encoding" circuit design may be utilized to provide flexibility to the control electronics. FIG. 4 shows a "one-hot-encoding" electronic circuit 119 for the dual-function keyboard 101. The electronic circuit 119 comprises a keyboard controller 129 and a plurality of key sensors 131. Each key sensor 131 is responsive to a visible key 103 or a hidden key 113 shown in FIG. 2 (the corresponding keys are shown as key 1, key 2 and key N in FIG. 4). The key sensor 131 preferably includes the key switch 121 and the keychip 123. The keyboard controller 129 and the key sensors 131 are preferably connected in series by 5 wires: a voltage wire (VCC), a ground wire (GND), a keyboard clock wire (Kclk), a controller wire (Cout/Cin), and a key scan wire (Kout).

The keyboard controller 129 generates key scan clock signals (Kclk) on the keyboard clock wire, which are common to all the keychips 123. The keyboard controller 129 starts a key scan cycle by activating a "Cout" signal on the controller wire for one clock cycle at the beginning of the scan cycle. The keyboard controller 129 pulls high (precharges) a "Kout" signal every other cycle following the "Cout" activation. Each keychip 123 can only pull down the "Kout" signal to a "low" level. When the first key sensor in the chain (key 1) detects the activated "Cout" signal, the keychip 123 expects that the keyborad controller 129 will pull the "Kout" signal high and precharge the "Kout" signal in next clock cycle. The keychip 123 is also programmed to pull down the "Kout" signal if the corresponding key is depressed during the cycle following the precharge cycle. Because the keyboard controller 129 will scan for the "Kout" signal every clock cycle after the precharge cycle, the keyboard controller 129 will recognize that a key is depressed if the "Kout" signal is low as explained below. Each keychip 123 regenerates the "Cout" signal for the following keychip 123 in the chain (e.g., the keychip 123 in key 1 regenerates the "Cout" signal for the keychip 123 in key 2).

Accordingly, each keychip 123 functions like a two-state state machine in which the first state is to wait for the controller to pull up the "Kout" signal. The second state is to transmit the key status by pulling down the "Kout" signal if the key is depressed while simultaneously passing the "Cout" signal to the next state. The entire keyboard electronics act as a 2N-state "one-hot-encoded" state machine if there are "N" number of keychip 123 on the dual-function keyboard 101.

The keyboard controller 129 can therefore detect exactly how many and which keys are depressed, from 0 keys to all the keys in the electronic circuit 119, by simply counting the number of clock cycles after the activation of the "Cout" signal. For example if the 1st, 3rd, and 7th keys in the chain are depressed, then the "Kout" signal will be low at 2nd, 6th, and 14th clock cycles after the activation of the "Cout" signal and high on other clock cycles.

FIGS. 5a–5d show snapshots of waveforms explaining the electronic circuit 119 operation in more detail. Kclk is the key scan clock signal generated by the keyboard controller 129. The Kclk signal may be generated internally by the keyboard controller 129. A frequency of around 1 MHz is generally adequate for a large number of keys, although different frequencies may be used.

Figure 5A:
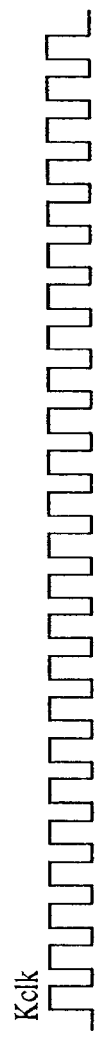
FIGS. 5a–5d are timing charts illustrating an operation of a keyboard scan by the keyboard controller.

FIG. 5a shows the activity of the keyboard controller 129. The keyboard controller 129 starts a scan cycle by activating the "Cout" signal and then precharging the "Kout" signal every other clock cycle. A complete scan cycle should be more than 2n+2 clock cycles, since it takes two clock cycles to scan each key sensor 131. This 2n+2 clock cycle scan also guarantees self reset of all the keychips 123 in the "one-hot-encoding" electronic circuit 119 such that only one keychip 123 will be active at a time. The keyboard controller 129 observes the "Kout" signal after each precharge cycle. If the "Kout" signal stays high, then the corresponding key in the electronic circuit 119 is not depressed. If the "Kout" signal is low, then the corresponding key in the electronic circuit 119 is depressed.

Figure 5B:
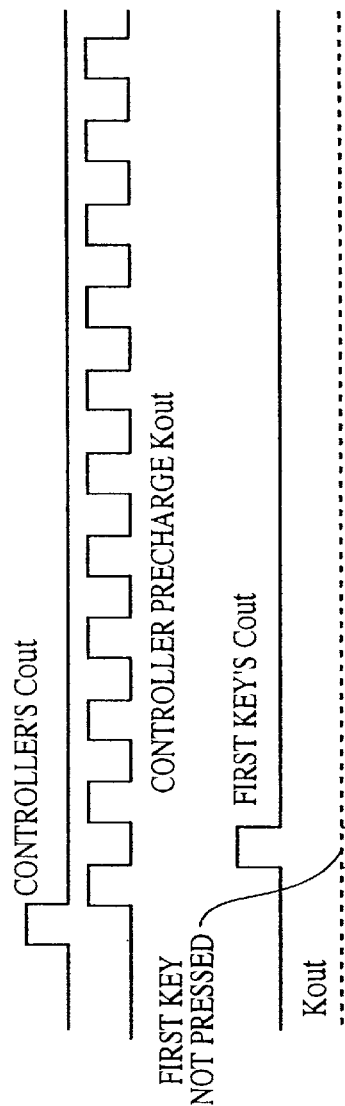

FIG. 5b shows activity of the first keychip 123 in the chain (key 1). The keychip 123 detects the "Cout" signal from the keyboard controller 129. The keychip 123 then waits the next clock cycle for the keyboard controller 129 to precharge the "Kout" signal. If key 1 is depressed, the key switch 121 is closed and the keychip 123 pulls down the "Kout" signal in the next clock cycle to inform the keyboard controller 129 that key 1 is depressed. Simultaneously, the keychip 123 re-generates the "Cout" signal to the second keychip 123 in the chain (key 2).

Figure 5C:
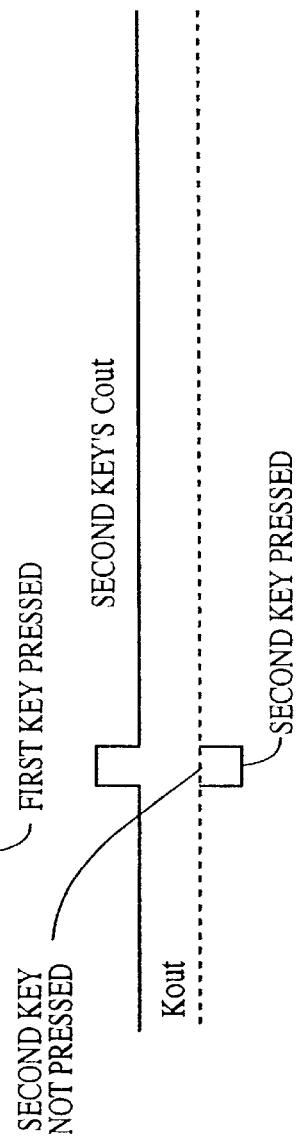

FIG. 5c shows the activity of the second keychip 123 in the chain. The second keychip 123 receives the "Cout" signal from the previous stage and behaves exactly the same way as the first keychip 123. The activity of the second keychip 123, however, is two clock cycles later than that of the first keychip 123. Remaining keychips 123 in the chain repeat this behavior when scanned by the keyboard controller 129.

Figure 5D:
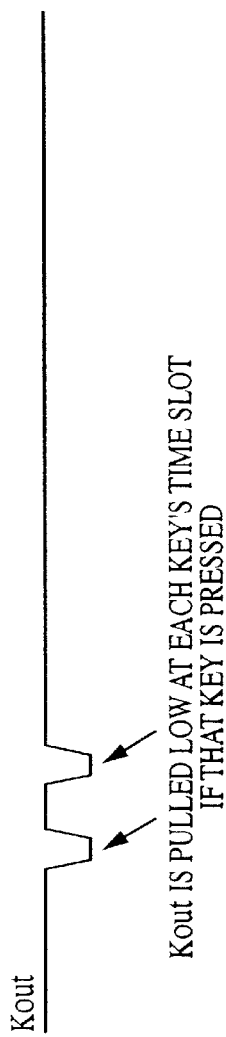

FIG. 5d shows the aggregate behavior of the "Kout" signal if the first two keys are depressed. The keyboard controller 129 ensures that the "Kout" signal is always precharged and will quickly return to the high level after being pulled low by a keychip 123. The keyboard controller 129 reads the level of the "Kout" signal after each precharge cycle to determine if the corresponding key in the chain is depressed.

Figure 6:
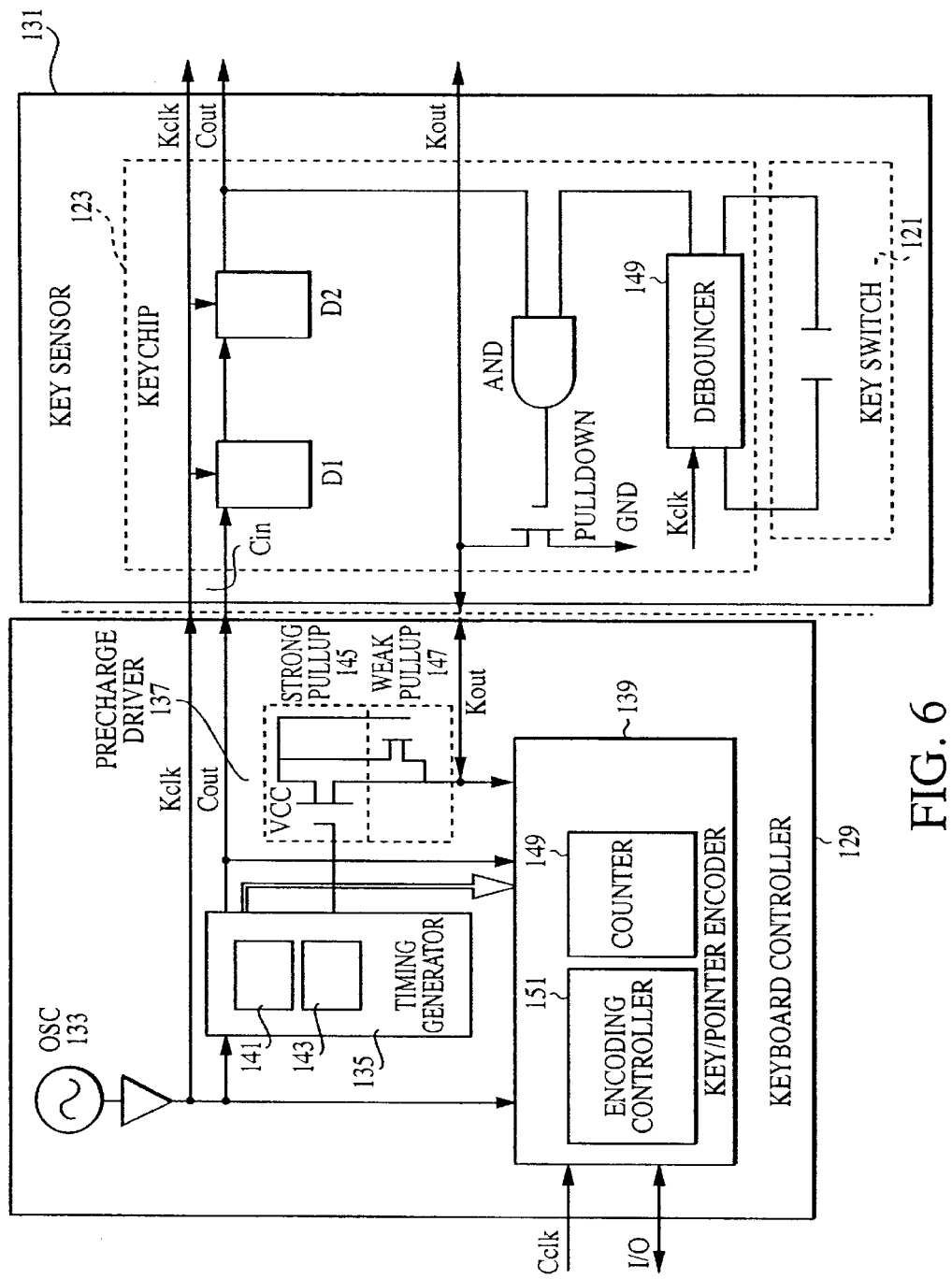
FIG. 6 is a more detailed diagram of a keyboard controller and a key sensor.

FIG. 6 shows, in greater detail, the keyboard controller 129 and the keychip 123. The keyboard controller 129 includes an internal oscillator (OSC) 133 that generates the keyboard clock signal "Kclk", a timing generator 135 that generates the "Cout" signal and the precharge pulses shown in FIG. 5a, a precharge driver 137 that precharges the "Kout" signal, and a key/pointer encoder 139 that receives scan information and generates scan codes.

In a preferred embodiment, the internal oscillator 133 may be a ring oscillator generating signals with a frequency of about 0.5–5 MHz, and preferably about 1 MHz. The timing generator 135 preferably comprises an internal counter 141 counting more or equal to 2n+2, and a terminal count detector 143 to generate the "Cout" signal. The least significant bit (LSB) of the counter 141 can be used to drive the precharge driver 137.

The precharge driver 137 preferably includes two field effect transistors (FET) 145 and 147. A large "strong pullup" FET 145 quickly pulls the "Kout" signal high and a smaller "weak pullup" FET 147 maintains a small charge to prevent erroneous discharge.

The key/pointer encoder 139 receives the "Kclk", "Cout", "Kout" signals, as well as signals from the internal counter 141 of the timing generator 135, and generates scan codes. The key/pointer encoder 139 starts an encoding cycle by receiving the "Cout" pulse. The key/pointer encoder 139 keeps a list of depressed keys by pushing the internal counter's 141 count value (shown by a thick arrow in FIG. 6) into a First-In-First-Out (FIFO) memory structure whenever the "Kout" signal is low. The key/pointer encoder 139 also increments its own counter 149 to keep track of how many keys are depressed in each scan cycle. A small encoding controller 151 within the key/pointer encoder 139 preferably makes logical decisions by reading a list of keys depressed in a scan cycle. When the mode switch M button 105 or 105' is not depressed, the encoding controller 151 generates a key-entry scan code if a single key is depressed. The encoding controller 151 preferably also makes decisions if more than one key is depressed. For example, if a new key appears in a depressed key list that contains the key depressed in the last scan cycle, the encoding controller 151 may decide that this is due to a fast typing person depressing the next key while still holding the previous key, and hence only generates the new key's code. When the mode switch M button 105 or 105' is depressed, the encoding controller 151 translates the position of the depressed key or keys to pointer movement scan codes, which contain both the direction and speed information. The encoding controller 151 may perform a mathematical averaging if a plurality of keys are pressed in close proximity to one another.

The keychip 123 preferably includes two flip-flops D1 and D2 forming the two states of a "one-hot-encoded" state machine, and a debouncer circuit 149. The flip-flop D1 delays the "Cout" signal coming from the previous stage to give time for the keyboard controller 129 to precharge the "Kout" signal. The flip-flop D2 regenerates the "Cout" for the next keychip sensor 131 while enabling the keychip 123 to pull the "Kout" signal low if the debouncer circuit 149 decides that the key switch 121 is actuated. The key switch 121 may be actuated by depressing or simply contacting the surface of a visible key 103 or a hidden key 113.

Figure 7A:
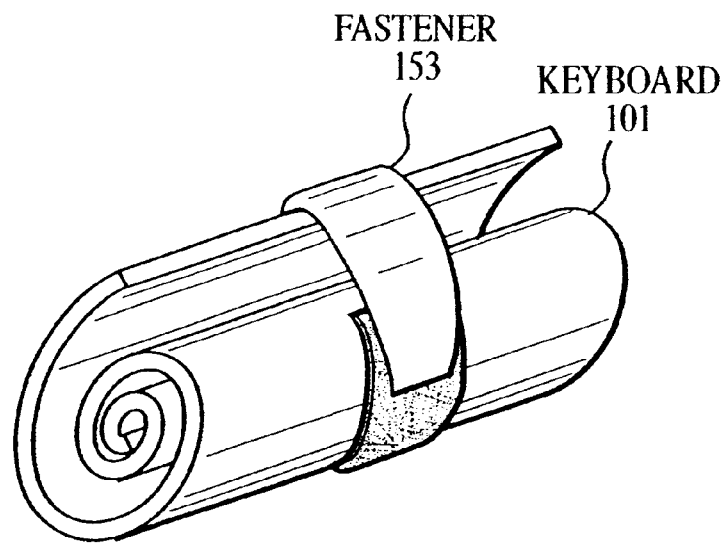
FIG. 7a and FIG. 7b show a flexible dual-function keyboard in a rolled-up and a folded configuration, respectively.
Figure 7B:
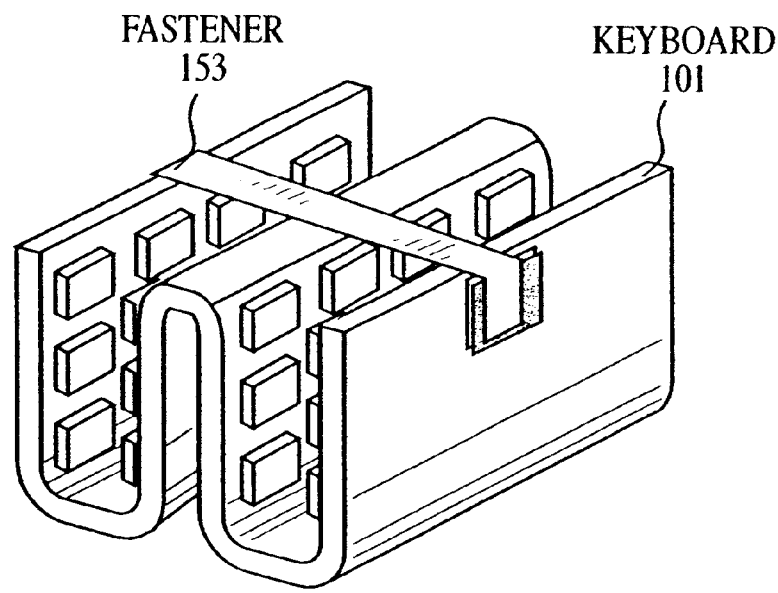

In a preferred embodiment, the dual-function keyboard 101 may be made of flexible materials to facilitate storage and transport. FIG. 7a shows a flexible dual-function keyboard 101 in a rolled-up configuration. The dual-function keyboard 101 is rolled into a compact cylinder and secured by a removable band 153 or other fasteners that may be attached to the dual-function keyboard 101, such as Velcro pads attached by adhesive. FIG. 7b shows a flexible dual-function keyboard 101 in a folded configuration. The folded dual-function keyboard 101 may likewise be secured by a removable band 153, or other fasteners that may be attached to the dual-function keyboard 101, such as Velcro pads attached by adhesive.

What is claimed is:

1. A dual-function keyboard comprising:
   a surface layer having a top side;
   a plurality of visible keys surrounding a reference point which generates a signal when actuated, each key including a key area on the top side of the surface layer and a key sensor;
   a mode switch for switching the keyboard between a typing mode and a pointing mode; and
   an encoding controller that generates key-entry scan codes when the keyboard is in a typing mode and pointer movement scan codes when the keyboard is in a pointing mode, wherein the pointer movement scan codes indicate speed and direction and are based on the direction and the distance of the key relative to the reference point.

2. The keyboard of claim 1, wherein each key sensor comprises a key switch and a keychip.

3. The keyboard of claim 2, wherein the keychip comprises a debouncer circuit.

4. The keyboard of claim 1, further comprising a marked reference point on the top side of the surface layer for a pointer movement.

5. The keyboard of claim 1, wherein the key areas on the surface layer are dimpled.

6. The keyboard of claim 1, further comprising a left mouse button and a right mouse button.

7. The keyboard of claim 6, wherein the mode switch, the left mouse button, and the right mouse button are located at a lower left corner of the keyboard.

8. The keyboard of claim 1 wherein the keyboard is foldable or rollable.

9. A dual-function keyboard comprising:
   a surface layer having a top side;
   a plurality of visible keys and a plurality of hidden keys surrounding a reference point wherein the keys generate a signal when the keys are active and actuated and wherein the visible keys includes a marked key area on the top side of the surface layer and the hidden keys are unmarked;
   a plurality of key sensors proximally located under the visible and the hidden keys;
   a mode switch for switching the keyboard between a typing mode wherein the key sensors associated with the hidden keys are inactive and a pointing mode wherein all of the key sensors are active; and
   an encoding controller that generates key-entry scan codes when the keyboard is in a typing mode and pointer movement scan codes when the keyboard is in a pointing mode, wherein the pointer movement scan codes indicate speed and direction and are based on the direction and the distance of the key relative to the reference point.

10. The keyboard of claim 9, wherein each key sensor comprises a key switch and a keychip.

11. The keyboard of claim 10, wherein the keychip comprises a debouncer circuit.

12. The keyboard of claim 9, further comprising a marked reference point on the top side of the surface layer for a pointer movement.

13. The keyboard of claim 9, wherein the key areas on the surface layer are dimpled.

14. The keyboard of claim 9, further comprising a left mouse button and a right mouse button.

15. The keyboard of claim 9 wherein the keyboard is foldable or rollable.

* * * * *